US012282434B2

(12) United States Patent
Gole et al.

(10) Patent No.: US 12,282,434 B2
(45) Date of Patent: *Apr. 22, 2025

(54) METHODS FOR MANAGING INPUT-OUTPUT OPERATIONS IN ZONE TRANSLATION LAYER ARCHITECTURE AND DEVICES THEREOF

(71) Applicant: NetApp, Inc., Sunnyvale, CA (US)

(72) Inventors: Abhijeet Prakash Gole, Cupertino, CA (US); Rohit Shankar Singh, Cary, NC (US); Douglas P. Doucette, San Diego, CA (US); Ratnesh Gupta, Dublin, CA (US); Sourav Sen, Cupertino, CA (US); Prathamesh Deshpande, Folsom, CA (US)

(73) Assignee: NETAPP, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,427

(22) Filed: Oct. 16, 2023

(65) Prior Publication Data

US 2024/0045807 A1 Feb. 8, 2024

Related U.S. Application Data

(63) Continuation of application No. 16/857,995, filed on Apr. 24, 2020, now Pat. No. 11,860,791.

(51) Int. Cl.
*G06F 12/10* (2016.01)
(52) U.S. Cl.
CPC ........ *G06F 12/10* (2013.01); *G06F 2212/657* (2013.01)

(58) Field of Classification Search
CPC ............... G06F 12/0246; G06F 3/0679; G06F 2212/7201; G06F 2212/202; G06F 3/061
USPC ........................... 711/103, 154, 12.001, 206
See application file for complete search history.

(56) References Cited

U.S. PATENT DOCUMENTS

| | | |
|---|---|---|
| 2006/0179212 A1 | 8/2006 | Kim et al. |
| 2013/0227201 A1 | 8/2013 | Talagala et al. |
| 2014/0095827 A1* | 4/2014 | Wei ........................ G06F 3/0644 711/203 |
| 2016/0342509 A1* | 11/2016 | Kotte .................. G06F 12/0246 |
| 2019/0146907 A1 | 5/2019 | Frolikov |

(Continued)

OTHER PUBLICATIONS

International Preliminary Report on Patentability for PCT/US2021/028876, dated Oct. 25, 2022.

(Continued)

*Primary Examiner* — Yaima Rigol
*Assistant Examiner* — Edward Waddy, Jr.
(74) *Attorney, Agent, or Firm* — TROUTMAN PEPPER LOCKE LLP

(57) ABSTRACT

The disclosed technology relates to determining physical zone data within a zoned namespace solid state drive (SSD), associated with logical zone data included in a first received input-output operation based on a mapping data structure within a namespace of the zoned namespace SSD. A second input-output operation specific to the determined physical zone data is generated wherein the second input-output operation and the received input-output operation is of a same type. The generated second input-output operation is completed using the determined physical zone data within the zoned namespace SSD.

20 Claims, 9 Drawing Sheets

(56) References Cited

U.S. PATENT DOCUMENTS

| | | |
|---|---|---|
| 2020/0089407 A1 | 3/2020 | Baca et al. |
| 2021/0081330 A1* | 3/2021 | Bennett ................. G06F 3/0679 |
| 2021/0089217 A1* | 3/2021 | Bjørling ............. G06F 11/2094 |
| 2021/0334215 A1 | 10/2021 | Gole et al. |

OTHER PUBLICATIONS

International Search Report and Written Opinion for International Application No. PCT/US2021/028876 dated Aug. 4, 2021, 10 pages.

Notice of Allowance mailed on Aug. 8, 2023 for U.S. Appl. No. 16/857,995, filed Apr. 24, 2020, 10 pages.

* cited by examiner

FIG. 5

Zone Translation Layer 216

Random Mapping Table in Conventional Namespace

| Logical Block | Physical Block |
|---|---|
| 0 | 10 |
| 1 | 11 |
| 2 | 12 |
| 3 | 13 |

Sequential Mapping Table in Zoned Namespace

| Logical Zone | Physical Zone |
|---|---|
| 10 | 0 |
| 11 | 1 |
| 12 | 2 |
| 13 | 3 |

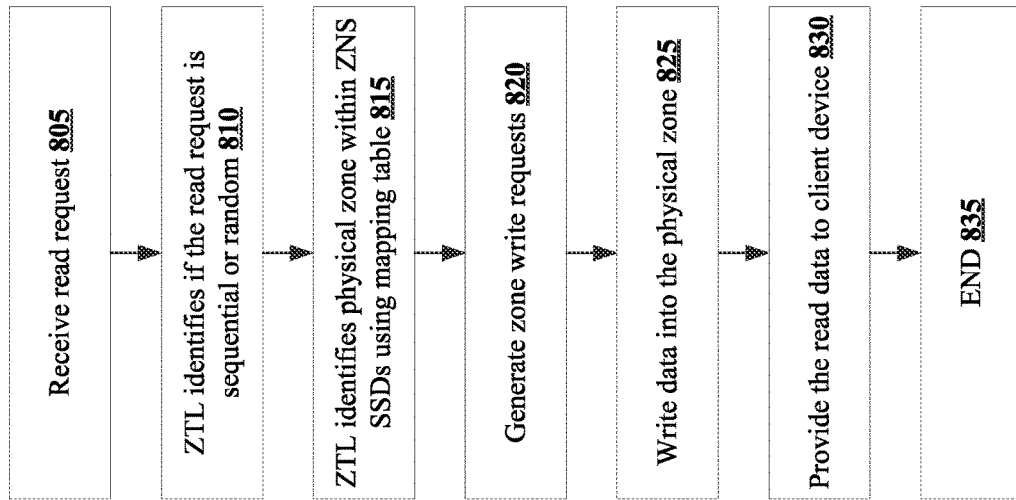

METHODS FOR MANAGING INPUT-OUTPUT OPERATIONS IN ZONE TRANSLATION LAYER ARCHITECTURE AND DEVICES THEREOF

This application is a continuation of U.S. patent application Ser. No. 16/857,995, filed Apr. 24, 2020, which is incorporated herein by reference in its entirety.

FIELD

The present technology pertains to the field of storage management, and particularly, directed to a method for managing input-output operations in a zone translation layer architecture and devices.

BACKGROUND

A Flash Translation Layer (FTL), or map, provides a translation from logical block addresses (LBAs) in a logical block address space (such as used by a host) to physical addresses in a non-volatile memory (NVM) of an input/output (I/O) device, such as a solid-state disk/drive (SSD). The FTL is located within the I/O device, such as the SSD, and physically separated from the host device, such as a storage controller.

Existing storage system technologies utilizes the FTL to perform one or more functions, such as input-output operations or garbage collections. To perform such functions, the FTL typically updates a FTL data structure, such as a FTL mapping table, maintained in memory of the storage system to keep track of the relocation of the data. The FTL mapping table typically translates a logical address associated with the data (e.g., as provided by an indirection data structure managed by a file system of the storage system) to a physical address associated with the SSDs (e.g., as provided by the FTL driver). However, updating and maintaining multiple data structures, including the mapping table, in memory with logical and physical addresses is costly in terms of computer resources (e.g., consumption of memory and translation processing). Additionally, the FTL data structure consumes memory and thereby results in the end user getting significantly less usable storage.

BRIEF DESCRIPTION OF THE DRAWINGS

FIG. 5 is an exemplary mapping tables present within the zone translation layer;

FIG. 8 is a flowchart illustrating an exemplary method for managing a read operation in a zone translation layer architecture.

DETAILED DESCRIPTION

Figure 1:
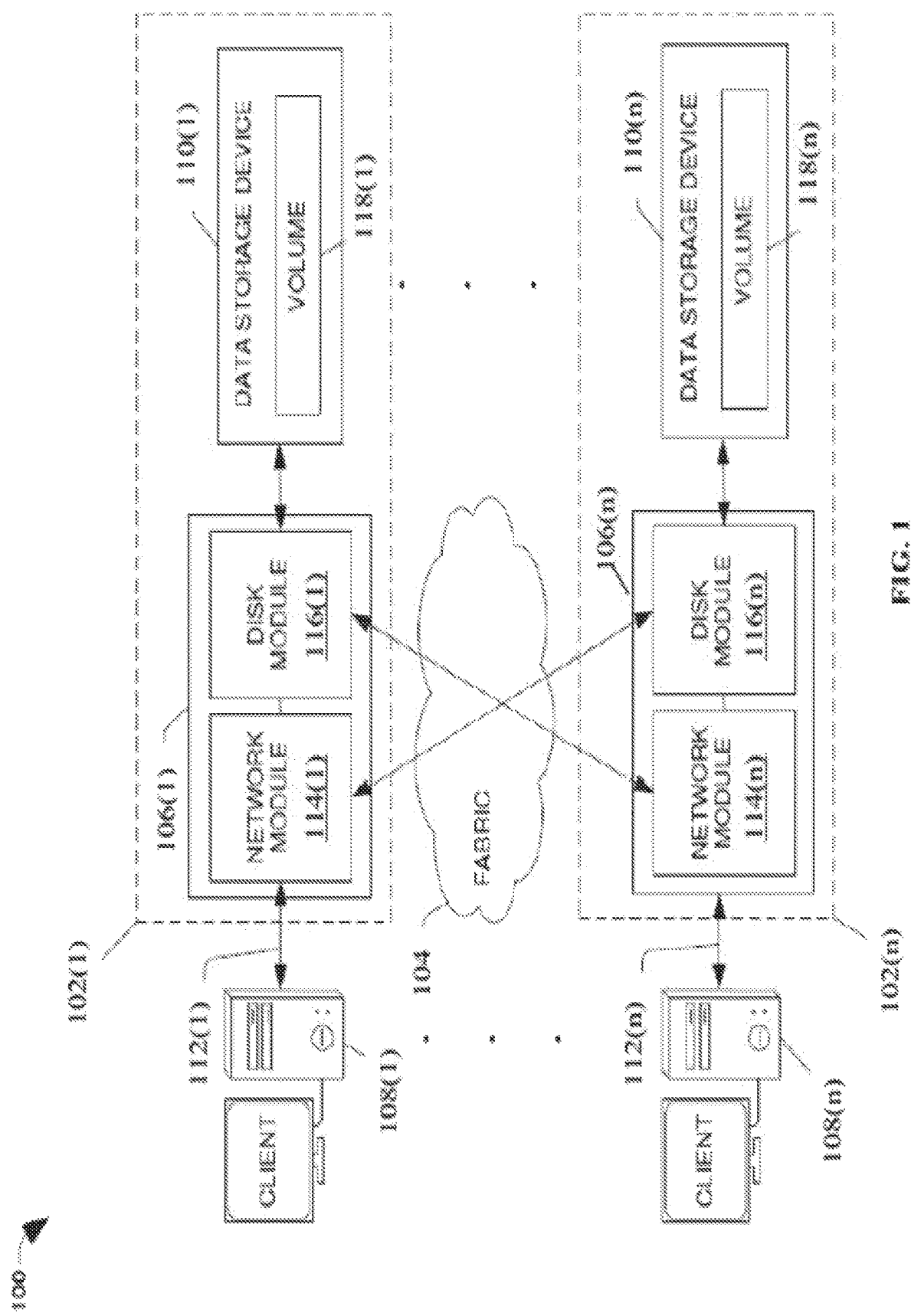
FIG. 1 is a block diagram of a network environment with exemplary data storage apparatuses each including a node computing device.

A clustered network environment 100 that may implement one or more aspects of the technology described and illustrated herein is shown in FIG. 1. The clustered network environment 100 includes data storage apparatuses 102(1)-102(n) that are coupled over a cluster fabric 104 facilitating communication between the data storage apparatuses 102(1)-102(n) (and one or more modules, components, etc. therein, such as, node computing devices 106(1)-106(n), for example), although any number of other elements or components can also be included in the clustered network environment 100 in other examples.

This technology provides a number of advantages including methods, non-transitory computer readable media, and devices that more effectively and efficiently handle storage devices with managing input-output operations in a zone translation layer architecture. The disclosed technology eliminates the flash translation layer (FTL) that is present within the SSDs and replaces the functions of the FTL with the zone translation layer (ZTL) that is present within the host device, such as node computing device. By configuring the ZTL to perform the functions of the FTL and removing the FTL from the SSDs, the disclosed technology is able to provide the end user substantially more usable storage when compared to existing storage system technologies.

In this example, node computing devices 106(1)-106(n) can be primary or local storage controllers or secondary or remote storage controllers that provide client devices 108(1)-108(n), with access to data stored within data storage devices 110(1)-110(n). The data storage apparatuses 102(1)-102(n) and/or node computing device 106(1)-106(n) of the examples described and illustrated herein are not limited to any particular geographic areas and can be clustered locally and/or remotely. Thus, in one example the data storage apparatuses 102(1)-102(n) and/or node computing device 106(1)-106(n) can be distributed over a plurality of storage systems located in a plurality of geographic locations. In another example, a clustered network can include data storage apparatuses 102(1)-102(n) and/or node computing device 106(1)-106(n) residing in a same geographic location (e.g., in a single onsite rack).

In the illustrated example, one or more of the client devices 108(1)-108(n), which may be, for example, personal computers (PCs), computing devices or storage (e.g., storage servers), and other computers or peripheral devices, are coupled to the respective data storage apparatuses 102(1)-102(n) by storage network connections 112(1)-112(n). Network connections 112(1)-112(n) may include a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc.

Illustratively, the client devices 108(1)-108(n) may be general-purpose computers running applications, and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage control configured to process I/O commands issued by the client devices 108(1)-108(n)), and the data storage apparatuses 102(1)-102(n) may return results of the request to the client devices 108(1)-108(n) via the storage network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within a data cloud), etc., for example. Such a node computing device 106(1)-106(n) can be a device attached to the fabric 104 as a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing device 106(1) may be located on a first storage site and the node computing device 106(n) may be located at a second storage site. The node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 108(n) with switchover data access to storage devices 110(n) in the event a disaster occurs at the second storage site). In other examples, the node computing device 106(n) can be configured according to an archival configuration and/or the node computing devices 106(1)-106(n) can be configured based on another type of replication arrangement (e.g., to facilitate load sharing). Additionally, while two node computing devices 106 are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to send input-output operations to the node computing devices 106(1)-106(n).

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n) when the node computing device 106(n) is available. Alternatively, when the node computing device 106(n) fails, the network module 114(1) of node computing device 106 (1) can access the data storage device 110(n) directly via the cluster fabric 104. The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(n) can be configured to connect data storage devices 110(1)-110(n), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI, FCP, SAS, NVMe, NVMe-oF for example, although other protocols can also be used. Thus, as seen from an operating system on either of node computing devices 106(1)-106(n), the data storage devices 110(1)-110 (n) can appear as locally attached. In this manner, different node computing devices 106(1)-106(n), etc. may access data blocks through the operating system, rather than expressly requesting abstract files.

While the clustered network environment 100 illustrates an equal number of network modules 114(1)-114(n) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108 (n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114 (n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, SSDs, storage class memories and any other similar media adapted to store information, including, for example, data (D) and/or parity (P) information.

The aggregates include volumes 118(1)-118(n) in this example, although any number of volumes can be included in the aggregates. The volumes 118(1)-118(n) are virtual data stores that define an arrangement of storage and one or more file systems within the clustered network environment 100. Volumes 118(1)-118(n) can span a portion of a disk or other storage device, a collection of disks, or portions of disks, for example, and typically define an overall logical arrangement of file storage. In one example volumes 118 (1)-118(n) can include stored data as one or more files or objects that reside in a hierarchical directory structure within the volumes 118(1)-118(n). Volumes 118(1)-118(n) are typically configured in formats that may be associated with particular storage systems, and respective volume formats typically comprise features that provide functionality to the volumes 118(1)-118(n), such as providing an ability for volumes 118(1)-118(n) to form clusters.

In one example, to facilitate access to data stored on the disks or other structures of the data storage device 110(1)-110(n), a file system (e.g., write anywhere file system (WAFL)) may be implemented that logically organizes the information as a hierarchical structure of directories and files. In this example, respective files may be implemented as a set of disk blocks configured to store information, whereas directories may be implemented as specially formatted files in which information about other files and directories are stored.

Data can be stored as files or objects within a physical volume and/or a virtual volume, which can be associated with respective volume identifiers, such as file system identifiers (FSIDs). The physical volumes correspond to at least a portion of physical storage devices, such as the data storage device 110(1)-110(n) (e.g., a Redundant Array of Independent (or Inexpensive) Disks (RAID system)) whose address, addressable space, location, etc. does not change. Typically the location of the physical volumes does not change in that the (range of) address(es) used to access it generally remains constant.

Virtual volumes, in contrast, are stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows them to be resized and/or flexible in some regards.

Further, virtual volumes can include one or more logical unit numbers (LUNs), directories, Qtrees, and/or files. Among other things, these features, but more particularly the LUNS, allow the disparate memory locations within which data is stored to be identified, for example, and grouped as a data storage unit. As such, the LUNs may be characterized as constituting a virtual disk or drive upon which data within the virtual volumes is stored within an aggregate. For example, LUNs are often referred to as virtual disks, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

In one example, respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2A:
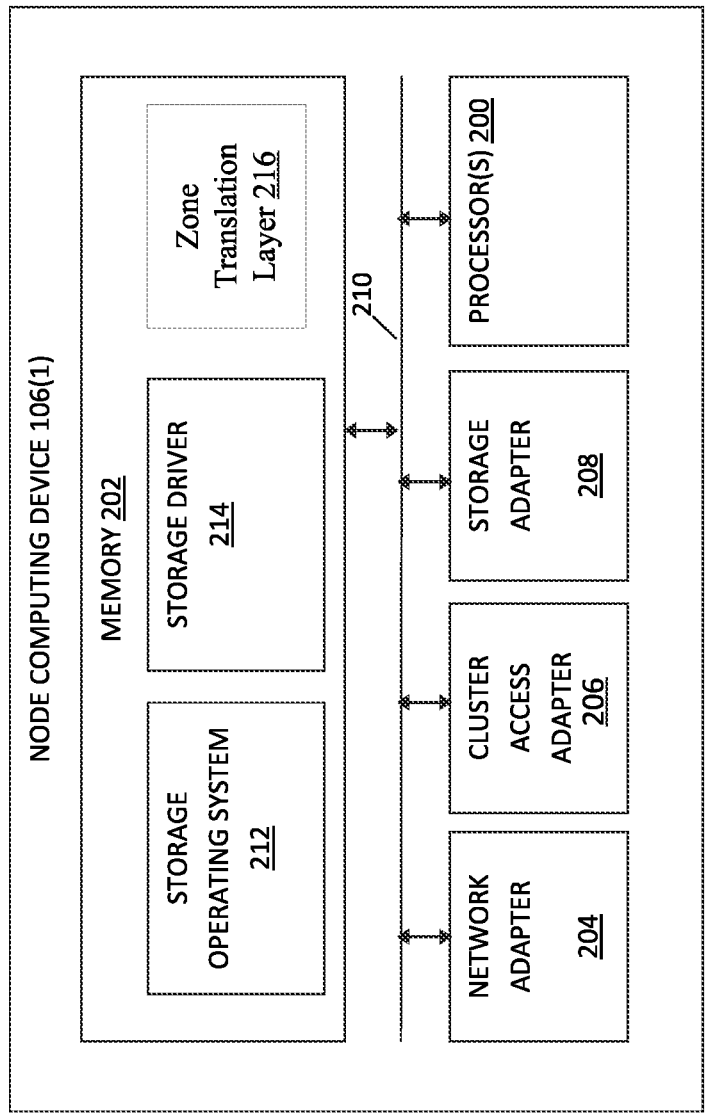
FIGS. 2A-2B are block diagrams of an exemplary one of the node computing devices and data storage drives shown in FIG. 1.

Referring to FIG. 2A, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a Redundant Array of Independent (or Inexpensive) Disks (RAID) data loss protection and recovery scheme to optimize a reconstruction process of data of a failed disk or drive in an array. In some examples, the node computing device 106(n) is substantially the same in structure and/or operation as node computing device 106(1), although the node computing device 106(n) can include a different structure and/or operation in one or more aspects than the node computing device 106(1) in other examples.

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) (e.g., or additional clustered devices) in accordance with the client device requests.

The storage operating system 212 can also establish one or more file systems including software code and data structures that implement a persistent hierarchical namespace of files and directories, for example. As an example, when a new data storage device (not shown) is added to a clustered network system, the storage operating system 212 is informed where, in an existing directory tree, new files associated with the new data storage device are to be stored. This is often referred to as "mounting" a file system.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

Additionally, the memory 202 of the node computing device 106(1) includes a zone translation layer 216 that assists performing input-output operations on the solid state drives (SSDs) portion of the data storage devices 110(1)-110(n) (FIG. 1), although the input-output operations can be performed on other types of storage devices. In one example, the zone translation layer 216 manages mapping and reading/writing of logical blocks to zones within the SSDs, although the zone translation layer 216 can perform other types or amounts of other operations.

Figure 2B:
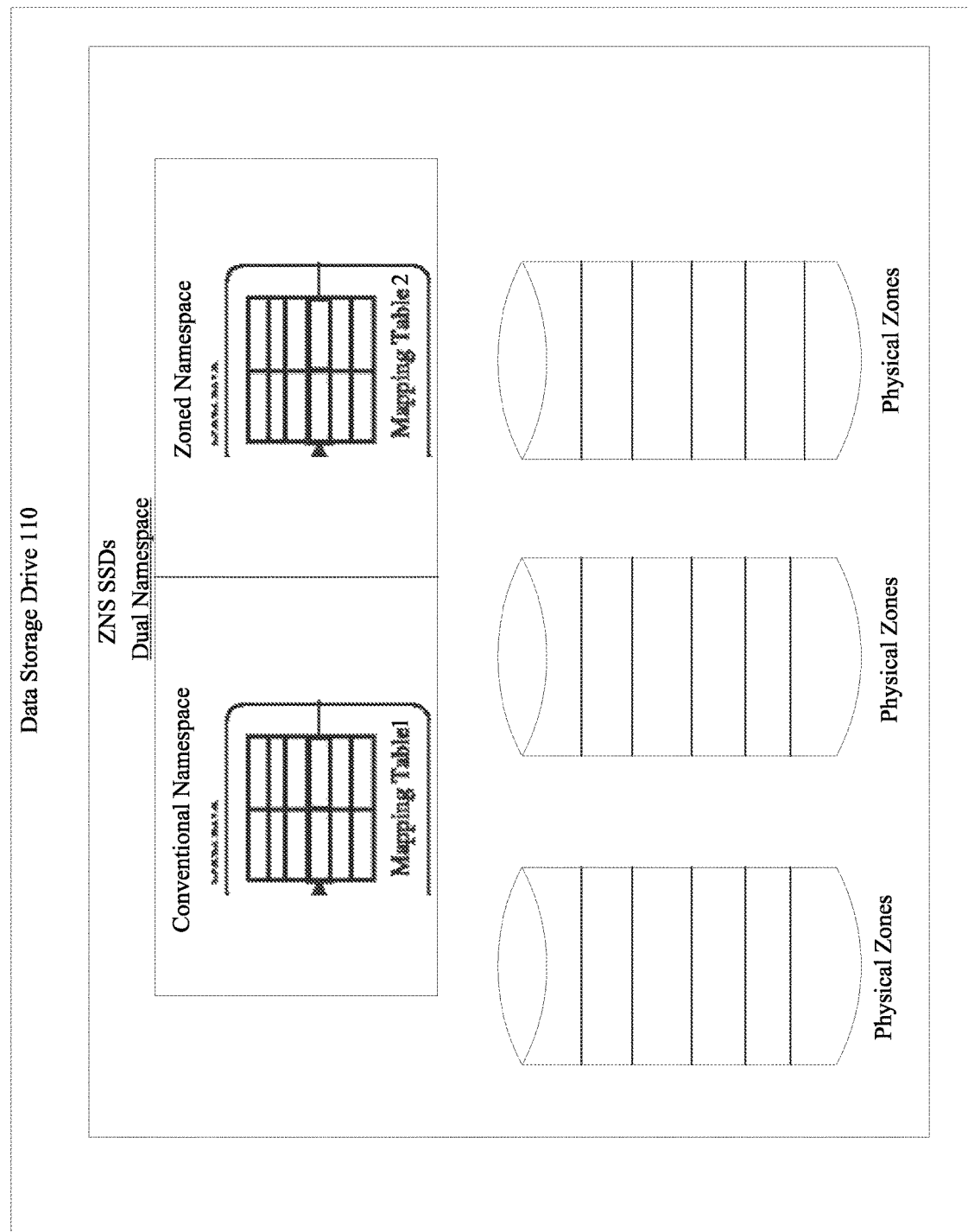

FIG. 2B is a block diagram of an exemplary data storage device 110 that is an SSD according to embodiments of the present disclosure. As illustrated in FIG. 2B, in this example, the SSDs in the data storage devices 110(1)-110(n) are arranged in a zoned namespace (and configuration (where the logical address space of the namespace is divided into zones), although the SSDs can be arranged in other configurations. Further, as illustrated in FIG. 2B, the ZNS SSDs includes dual namespaces, i.e., a conventional namespace and a zoned namespace. Here, a namespace relates to a logical grouping of SSDs and a zoned namespace relates to dividing the logical address space of a namespace into zones. Accordingly, the conventional namespace within the ZNS SSD includes a data structure, such as a mapping table by way of example, to correlate logical block to a physical block, although the mapping table can include other types or amounts of information. In this example, the zoned namespace within the ZNS SSDs includes a data structure, such as a mapping table by way of example, to correlate logical zone to a physical zone, although the mapping table can include other types or amounts of information.

Accordingly, the examples may be embodied as one or more non-transitory computer readable media having machine or processor-executable instructions stored thereon for one or more aspects of the present technology, as described and illustrated by way of the examples herein, which when executed by the processor(s) 200 (FIG. 2A), cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-8, for example.

Referring again to FIG. 2A, the network adapter 204 in this example includes the mechanical, electrical and signaling circuitry needed to connect the node computing device 106(1) to one or more of the client devices 108(1)-108(n) over storage network connections 112(1)-112(n), which may comprise, among other things, a point-to-point connection or a shared medium, such as a local area network. In some examples, the network adapter 204 further communicates (e.g., using TCP/IP) via the fabric 104 and/or another network (e.g. a WAN) (not shown) with cloud storage devices to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, SSDs, and/or any other similar media adapted to store information.

In the exemplary data storage devices 110(1)-110(n), information can be stored in data blocks on disks. The storage adapter 208 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP), or NVMe/NVMeoF. The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(n), or alternatively sent to another node computing device attached via the cluster fabric 104. In some examples, a storage driver 214 in the memory 202 interfaces with the storage adapter to facilitate interactions with the data storage devices 110(1)-110(n), as described and illustrated in more detail later with reference to FIGS. 3-8.

Figure 3:
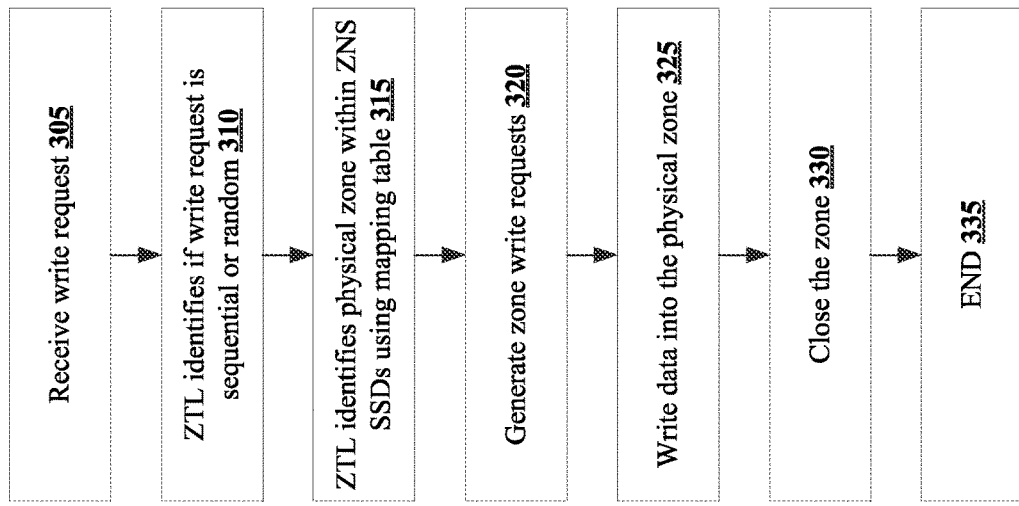
FIG. 3 is a flowchart of an exemplary method for managing a write operation in a zone translation layer architecture.
Figure 4:
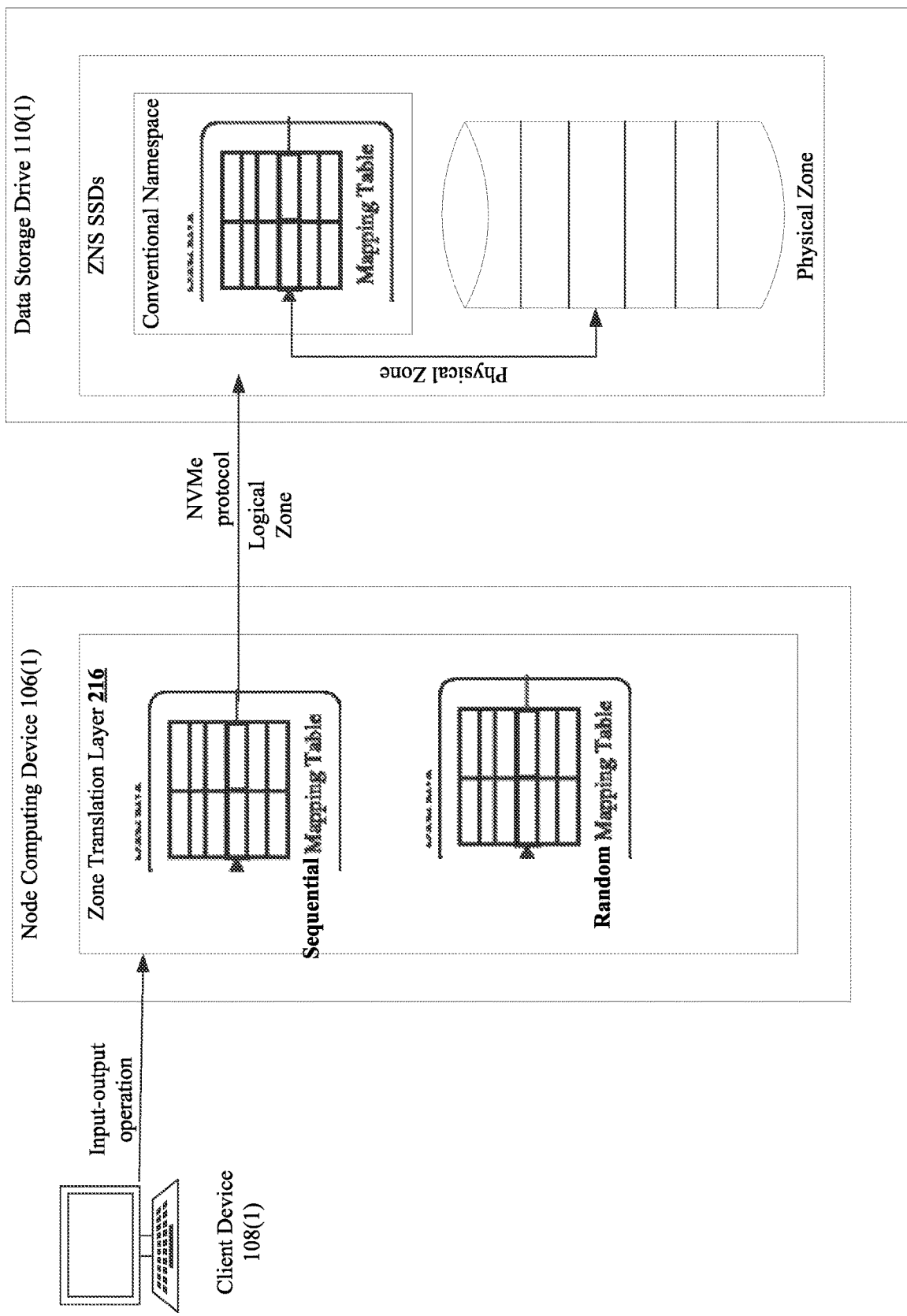
FIG. 4 is an exemplary block diagram illustrating managing a read request and a write request in a zone translation layer architecture.

An exemplary method for managing input-output operations in a zone translation layer architecture storage devices will now be illustrated and described with reference to FIGS. 3-8. Referring more specifically to FIGS. 3-4, the exemplary method begins at step 305 where in this illustrative example the node computing device 106(1) receives a write request from a client device 108(1), although the node computing device 106(1) can receive other types or numbers of requests. While this example illustrates the node computing device 106(1) performing the steps illustrated in FIGS. 3-8, it is to be understood that other node computing devices in the plurality of node computing devices 106(1)-106(n) can perform the steps illustrated in FIGS. 3-8. Additionally in this example, the write request also includes a logical zone to which the data is to be written, although the received input-output operation can include other types or amounts of information. In this example, zone relates to a portion of the zoned namespace SSD with contiguous logical block address with specific write access rules. For example, the write request can include the logical zone (e.g., 10) to which the data has to be written.

Next in step 310, the zone translation layer 216 within the node computing device 106(1) maps the logical zone present in the received write request to the corresponding physical zone by referring to the mapping table. In this example and as illustrated in FIG. 4, the zone translation layer 216 within the node computing device 106(1) includes a random mapping data structure that assists with random writes that are received from the client device 108(1) (in this example) and a sequential mapping data structure that assists with sequential write operations. Accordingly, when the received write request is a sequential write request, the zone translation layer 216 within the node computing device 106(1) uses the sequential mapping data structure (e.g., a sequential mapping table) to map the logical zone to physical sequential write zone. Alternatively, when the received write request is a random write request, the zone translation layer 216 within the node computing device 106(1) uses the random mapping data structure (e.g., a random mapping table) to map the logical block to the physical block zone. In this example, a block is the smallest unit of data store within the zone in an SSD. By way of example, FIG. 5 illustrates the random mapping table and the sequential mapping table in the zone translation layer (ZTL) 216 that includes the logical zone and the corresponding physical zone, although the ZTL mapping table can include other types or amounts of information. For example, the logical zone 10 received in the write request (e.g., as a sequential write request) corresponds to physical sequential write zone 0 in the sequential mapping table. Furthermore, in this example, the zone translation layer 216 within the node computing device 106(1) determines whether the received write request is a sequential write request or a random write request based on the logical zone or block to which the data has to be written. By way of example and for purpose of further illustration, if the node computing device 106(1) receives a write operation to zones or blocks that are sequentially next to each other within the SSD, then the received write request is determined to be a sequential write request. Alternatively, if the node computing device receives a write operation to zones or blocks that are not sequential, or randomly distributed across the SSD, then the received write request is classified as a random write request.

In step 315, the zone translation layer 216 within the node computing device 106(1) identifies the physical zone corresponding to the logical zone based on the mapping table present in the zoned namespace of the SSDs in the data storage devices 110(1)-110(n). Although in other examples, different parameters or techniques can be used to identify the physical zone corresponding to the logical zone. In this illustrative example, the zoned namespace of the SSDs includes a current mapping table that includes a map between the logical zone and the physical zone and the logical block to the physical block. In this example, the zone translation layer 216 within the node computing device 106(1) communicates with the zoned namespace SSDs using the non-volatile memory express (NVMe) protocol to identify the physical zone, although other type protocols could be used for the communication.

Figure 6:
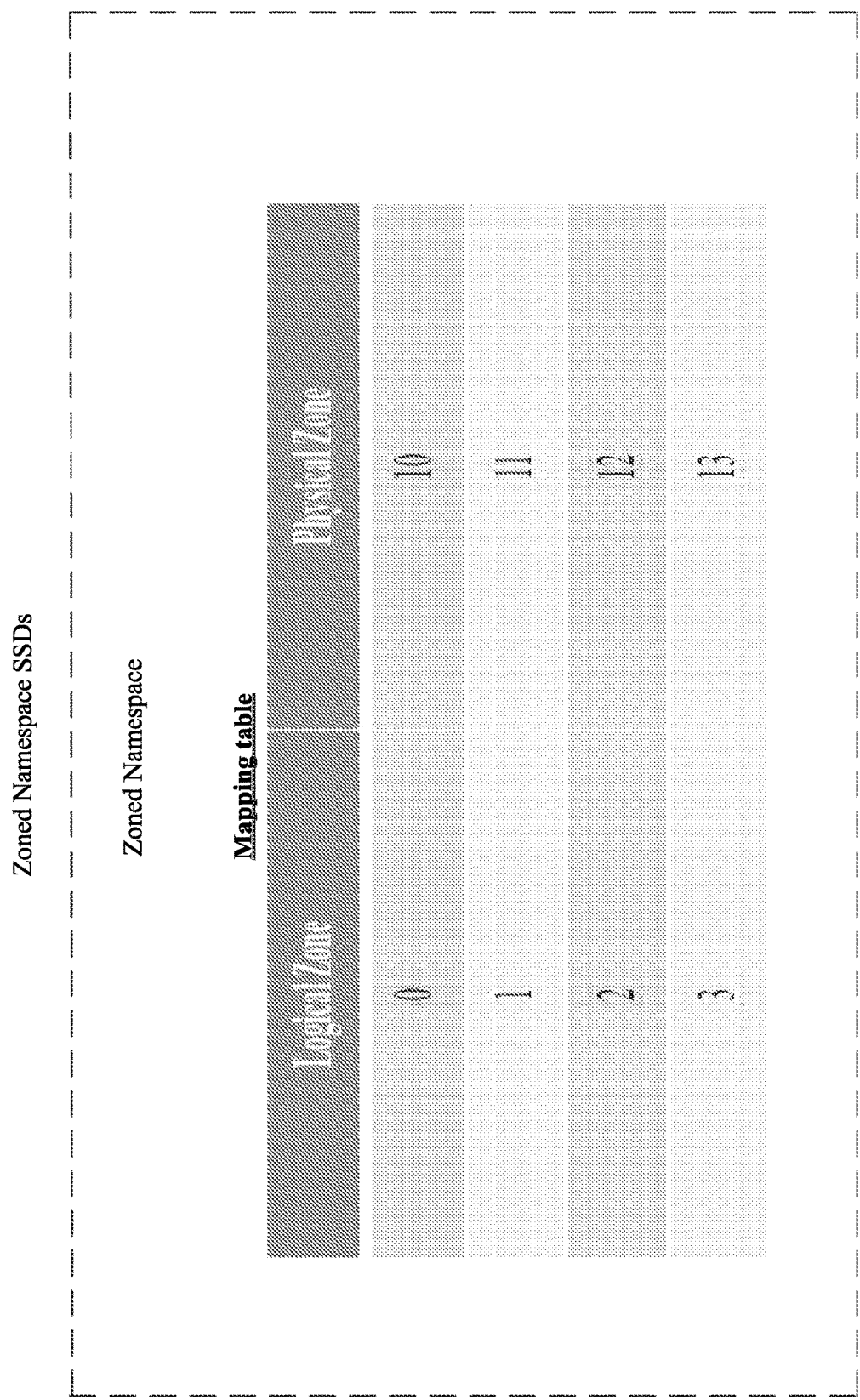
FIG. 6 is an exemplary mapping table present within the zoned namespace SSDs.
Figure 7:
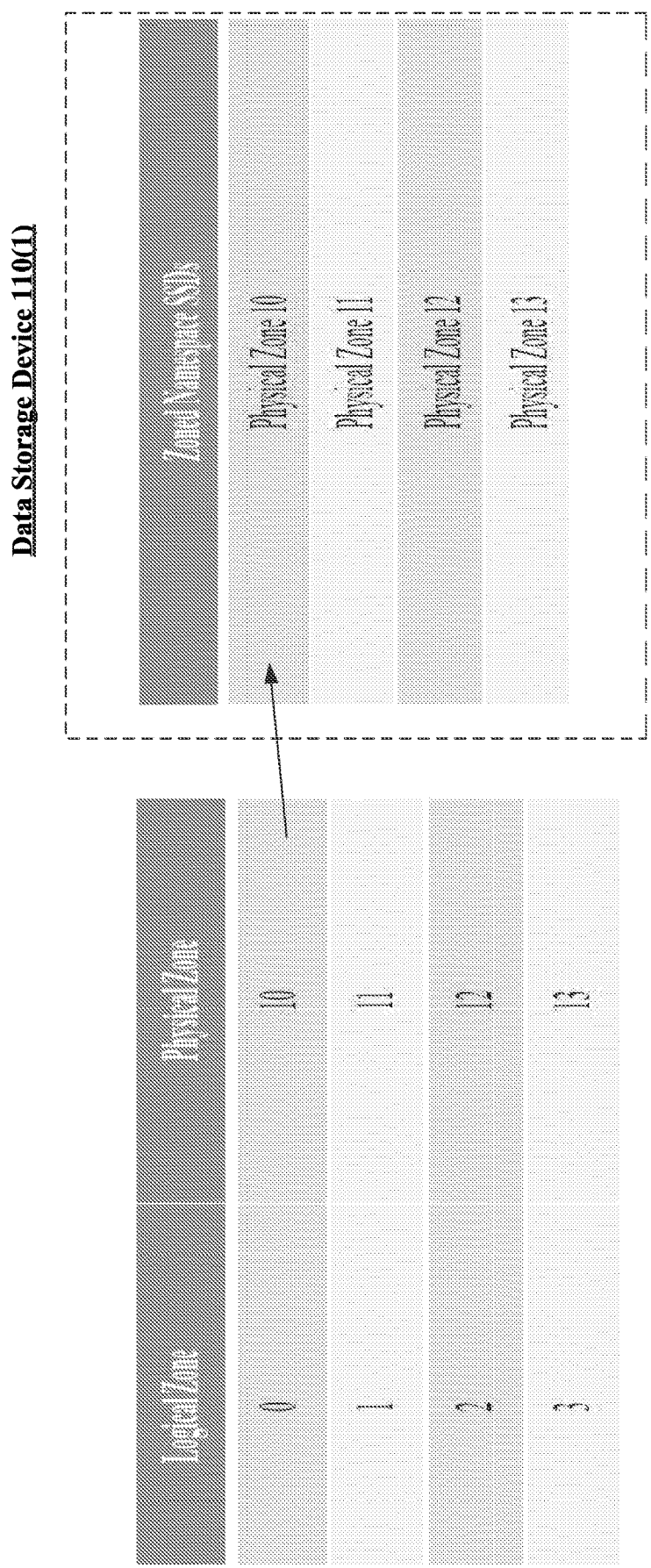
FIG. 7 is an exemplary mapping table illustrating correlation between logical zone and physical zone.

Further, the zoned namespace SSDs are dual namespace devices and therefore the zoned namespace SSDs include both the conventional namespace and the zoned namespace. In this example, the zoned namespace includes a sequential mapping table that assists with correlating a logical zone to a physical zone; and the conventional namespace includes the random mapping table that assists with correlating a logical block to a physical block. By way of example, FIG. 6 illustrates the mapping table that correlates the logical zone to the physical zone present within the zoned namespace of the ZNS SSDs. For purpose of further illustration, logical zone 0 correlates to physical zone 10, for example.

In step 320, the zone translation layer 216 within the node computing device 106(1) generates a zone write request to write the data into the identified physical zones.

In step 325, the zone translation layer 216 within the node computing device 106(1) sequentially writes the data into the physical zone identified in step 315, although the zone translation layer 216 can write at other memory locations. By way of example, here the zone translation layer 216 writes the data to physical zone 10 illustrated in FIG. 7.

In step 330, the zone translation layer 216 within the node computing device 106(1) performs a close operation on the identified physical zone to which the data is written and the exemplary method ends at step 335. While the above illustrated technology illustrates a sequential write operation, it is to be understood that a random write operation may also be performed using the technique illustrated above.

Next, an exemplary method for managing read operation in a zone translation layer architecture storage devices will now be illustrated with reference to FIGS. 4-8. Referring more specifically to FIGS. 4 and 8, the exemplary method begins at step 805 where in this illustrative example the node computing device 106(1) receives a read request from a client device 108(1), although the node computing device 106(1) can receive other types or numbers of requests. Additionally in this example, the received read request also includes a logical zone from which the data is required to be read, although the read request can include other types or amounts of information. For example, the read request can include logical zone 10 from which the data is required to be read.

Next in step 810, the zone translation layer 216 within the node computing device 106(1) maps the logical zone present in the received read request operation to the corresponding physical zone by referring to the mapping table. In this example and as illustrated in FIG. 4, the zone translation layer 216 within the node computing device 106(1) includes a random mapping data structure that assists with random read requests that are received from the client device 108(1) and a sequential mapping data structure that assists with sequential read requests. Accordingly, when the received read request is a sequential read request, the zone translation layer 216 within the node computing device 106(1) uses the sequential mapping data structure (e.g., a mapping table) to map the logical zone to the physical zone. Alternatively, when the received read request is a random read request, the zone translation layer 216 within the node computing device 106(1) uses the random mapping data structure (e.g., random mapping table) to map the logical block to the physical block.

By way of example, FIG. 5 illustrates the random mapping table and the sequential mapping table in the zone translation layer (ZTL) 216 that includes the logical zone to the corresponding physical zone (sequential mapping table) and logical block to the corresponding physical block (random mapping table), although the ZTL mapping table can include other types or amounts of information. For example, the logical zone 10 received in the read request corresponds to physical zone 0 in the sequential mapping table. Furthermore, in this example, the zone translation layer 216 within the node computing device 106(1) determines whether the received read request is a sequential read request or a random read request based on the logical zone to which the data is to be read, although other techniques or parameters can be used to make the determination.

In step 815, the zone translation layer 216 within the node computing device 106(1) identifies the physical zone corresponding to the logical zone based on the mapping table present in the zoned namespace of the SSDs in the data storage devices 110(1)-110(n). Although in other examples, different parameters or techniques can be used to identify the physical zone corresponding to the logical zone. In this example, the zone translation layer 216 within the node computing device 106(1) communicates with the zoned namespace SSDs using the non-volatile memory express (NVMe) protocol to identify the physical zone, although other type protocols could be used for the communication.

Further, the zoned namespace SSDs are dual namespace devices and therefore the zoned namespace SSDs include both the conventional namespace and the zoned namespace. In this example, the zoned namespace includes sequential mapping table that assists with correlating logical zone to a physical zone; and the conventional namespace includes the random mapping table that assists with correlating logical block to a physical block. By way of example, FIG. 6 illustrates the mapping table that correlates the logical zone to the physical zone present within the zoned namespace of the ZNS SSDs. For purpose of further illustration, logical zone 0 correlates to physical zone 10, for example.

In step 820, the zone translation layer 216 within the node computing device 106(1) generates a zone read request to read the data into the identified physical zones.

In step 825, the zone translation layer 216 within the node computing device 106(1) sequentially reads the data from the physical zone identified in step 315, although the zone translation layer 216 can read at other memory locations. By way of example, here the zone translation layer 216 reads the data to physical zone 10 illustrated in FIG. 7.

In step 830, the zone translation layer 216 within the node computing device 106(1) provides the requesting client device 108(1) with the data read from the physical zone and the exemplary method ends at step 835. While the above illustrated example describes a sequential read request, it is to be understood that a random read request may be handled using the techniques illustrated above.

As illustrated and described by way of examples herein, this technology provides a number of advantages including methods, non-transitory computer readable media, and devices that more effectively and efficiently handle storage devices with managing input-output operations in a zone translation layer architecture. The disclosed technology eliminates the flash translation layer (FTL) that is present within the SSDs and replaces the functions of the FTL with the zone translation layer (ZTL) that is present within the host device, such as node computing device. By configuring the ZTL to perform the functions of the FTL and removing the FTL from the SSDs, the disclosed technology is able to provide the end user substantially more usable storage when compared to the existing storage system technologies.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method implemented by a zone translation layer (ZTL) executed by a computing device, the method comprising:
    identifying physical zone data within a zoned namespace solid state drive (SSD), the physical zone data is mapped to logical zone data in a mapping data structure within the zoned namespace SSD, the mapping data structure including a random mapping data structure for processing random input/output operations and a sequential mapping data structure for processing sequential input/output operations;
    generating a data storage operation based on the physical zone data, wherein the logical zone data is associated with a received data storage operation; and
    executing the generated data storage operation using the physical zone data to facilitate servicing of the received data storage operation.

2. The method as set forth in claim 1, further comprising identifying the physical zone data further based on one of a plurality of types of the received data storage operation, wherein the generated data storage operation is of the one of the plurality of types of the received data storage operation.

3. The method as set forth in claim 1, wherein the generated data storage operation is executed via communication with the zoned namespace SSD using a non-volatile memory express (NVMe) protocol and the method further comprises communicating with the zoned namespace SSD using the NVMe protocol to determine the physical zone data.

4. The method as set forth in claim 1, further comprising returning data retrieved from a physical zone of the zoned namespace SSD to execute the generated data storage operation.

5. The method as set forth in claim 1, wherein the zoned namespace SSD comprises a conventional namespace and a zoned namespace, the conventional namespace comprises a first mapping of logical blocks to physical blocks, and the zoned namespace comprises a second mapping of logical zones mapped to physical zones.

6. The method as set forth in claim 2, further comprising determining whether the received data storage operation is a sequential operation or a random operation based on the logical zone data to identify the one of the plurality of types before retrieving the physical zone data from the mapping data structure.

7. A non-transitory machine readable medium having stored thereon instructions comprising executable code that, when executed by a zone translation layer (ZTL) of a computing device, causes the computing device to:
    generate a data storage operation based on physical zone data mapped to logical zone data in a mapping data structure within a zoned namespace solid state drive (SSD), the mapping data structure including a random mapping data structure for processing random input/output operations and a sequential mapping data structure for processing sequential input/output operations, wherein the logical zone data is identified in a received data storage operation; and
    execute the generated data storage operation using the physical zone data to service the received data storage operation.

8. The non-transitory machine readable medium as set forth in claim 7, wherein the executable code, when executed by the ZTL of the computing device, further causes the computing device to identify the physical zone data further based on one of a plurality of types of the received data storage operation, wherein the generated data storage operation is of the one of the plurality of types.

9. The non-transitory machine readable medium as set forth in claim 7, wherein the executable code, when executed by the ZTL of the computing device, further causes the computing device to return data retrieved from a physical zone of the zoned namespace SSD, wherein the physical zone is identified in the physical zone data.

10. The non-transitory machine readable medium as set forth in claim 7, wherein the generated data storage operation is executed via communication with the zoned namespace SSD using a non-volatile memory express (NVMe) protocol and the executable code, when executed by the ZTL of the computing device, further causes the computing device to communicate with the zoned namespace SSD using the NVMe protocol to determine the physical zone data.

11. The non-transitory machine readable medium as set forth in claim 7, wherein the zoned namespace SSD comprises a conventional namespace and a zoned namespace, the conventional namespace comprises a first mapping table comprising correlations of logical blocks to physical blocks, and the zoned namespace comprises a second mapping table comprising other correlations of logical zones to physical zones.

12. The non-transitory machine readable medium as set forth in claim 8, wherein the executable code, when executed by the ZTL of the computing device, further causes the computing device to determine whether the received data storage operation is a sequential operation or a random operation based on the logical zone data to identify the one of the plurality of types before retrieving the physical zone data from the data structure.

13. A computing device, comprising:
    memory containing machine readable medium comprising a zoned translation layer (ZTL) comprising instructions; and
    one or more processors coupled to the memory and configured to execute the instructions to cause the processors to:
        identify physical zone data mapped in a mapping data structure within a zoned namespace solid state drive (SSD) to logical zone data extracted from a received data storage operation, the mapping data structure including a random mapping data structure for processing random input/output operations and a sequential mapping data structure for processing sequential input/output operations; and
        execute a data storage operation using the physical zone data to service the received data storage operation, wherein the executed data storage operation is generated based on the physical zone data.

14. The computing device as set forth in claim 13, wherein the mapping data structure is a mapping table comprising a mapping between the logical zone data and the physical zone data associated with the zoned namespace SSD.

15. The computing device as set forth in claim 13, wherein the processors are further configured to execute the machine executable code of the ZTL to further cause the processors to write data extracted from the received data storage operation to executed the generated data storage operation.

16. The computing device as set forth in claim 13, wherein the generated data storage operation is executed via communication with the zoned namespace SSD using a non-volatile memory express (NVMe) protocol and the processors are further configured to execute the instructions to further cause the processors to communicate with the zoned namespace SSD using the NVMe protocol to determine the physical zone data.

17. The computing device as set forth in claim 13, wherein the zoned namespace SSD comprises a conventional namespace and a zoned namespace, the conventional namespace comprises a correlations of logical blocks to physical blocks, and the zoned namespace comprises another correlation of logical zones to physical zones.

18. The computing device as set forth in claim 13, wherein the processors are further configured to execute the instructions to further cause the processors to identify the physical zone data further based on one of a plurality of types of the received data storage operation, wherein the generated data storage operation is of the one of the plurality of types.

19. The computing device as set forth in claim 18, wherein the processors are further configured to execute the instructions to further cause the processors to determine whether the received data storage operation is a sequential operation or a random operation based on the logical zone data to identify the one of the plurality of types before retrieving the physical zone data from the data structure.

20. The computing device as set forth in claim 13, wherein the mapping data structure comprises a mapping between logical block data and physical block data associated with the zoned namespace SSD.

* * * * *